(12) United States Patent
Flier et al.

(10) Patent No.: US 10,567,301 B2
(45) Date of Patent: Feb. 18, 2020

(54) IMPLEMENTATION OF THIRD PARTY SERVICES IN A DIGITAL SERVICE PLATFORM

(71) Applicant: Google Inc., Mountain View, CA (US)

(72) Inventors: Holger-Frederik Robert Flier, Canton of Zurich (CH); Marcus Boerger, Canton of Zurich (CH)

(73) Assignee: Google LLC, Mountain View, CA (US)

(*) Notice: Subject to any disclaimer, the term of this patent is extended or adjusted under 35 U.S.C. 154(b) by 242 days.

(21) Appl. No.: 14/937,256

(22) Filed: Nov. 10, 2015

(65) Prior Publication Data

US 2016/0134556 A1    May 12, 2016

Related U.S. Application Data

(60) Provisional application No. 62/077,373, filed on Nov. 10, 2014.

(51) Int. Cl.
*H04L 12/911* (2013.01)
*H04L 29/08* (2006.01)
*H04W 4/029* (2018.01)

(52) U.S. Cl.
CPC .......... *H04L 47/70* (2013.01); *H04L 67/1044* (2013.01); *H04W 4/029* (2018.02)

(58) Field of Classification Search
CPC ....... H04L 47/70; H04L 67/1044; H04W 4/02
See application file for complete search history.

(56) References Cited

U.S. PATENT DOCUMENTS

| 7,328,263 | B1* | 2/2008 | Sadjadi | G06F 9/526 707/999.008 |
|---|---|---|---|---|
| 8,639,582 | B1* | 1/2014 | Sirota et al. | 705/26.1 |
| 8,681,630 | B1* | 3/2014 | Gibson | H04L 67/325 370/235 |
| 2008/0209451 | A1* | 1/2008 | Michels et al. | 719/328 |

(Continued)

FOREIGN PATENT DOCUMENTS

| CN | 101562621 | 10/2009 |
|---|---|---|
| CN | 102122329 | 7/2011 |

OTHER PUBLICATIONS

PCT International Search Report for corresponding PCT Application No. PCT/US2015/059869, dated Jan. 15, 2016, 4 pages.

*Primary Examiner* — Tonia L Dollinger
*Assistant Examiner* — Steven C Nguyen
(74) *Attorney, Agent, or Firm* — Dority & Manning, P.A.

(57) ABSTRACT

Systems and method for implementing third party services in digital service platform are provided. More specifically, an application program interface can be provided by a first service provider to a second service provider. The application program interface can be configured to receive one or more access parameters and can be associated with implementing one or more services of the second service provider in one or more services of a second service provider. The one or more access parameters can then be received by the first service provider from the second service provider. Once the one or more access parameters have been received, the first service provider can receive a request from a user for access to the one or more services of the second service provider. The first service provider can then determine whether to grant access to the user based on the access parameters.

19 Claims, 5 Drawing Sheets

(56) References Cited

U.S. PATENT DOCUMENTS

2009/0089591 A1\* 4/2009 Mattsson ............ G06F 21/6227
    713/193
2009/0325606 A1   12/2009 Farris
2012/0042036 A1\* 2/2012 Lau et al. ..................... 709/201
2012/0060062 A1   3/2012 Lin et al.
2012/0270567 A1\* 10/2012 Johnson ................ H04W 76/11
    455/456.3
2013/0073377 A1\* 3/2013 Heath et al. .................. 719/328
2014/0379914 A1\* 12/2014 Odenheimer ....... H04L 41/5041
    709/225
2016/0149627 A1\* 5/2016 De Gaudenzi ....... H04B 7/0615
    370/329

\* cited by examiner

IMPLEMENTATION OF THIRD PARTY SERVICES IN A DIGITAL SERVICE PLATFORM

PRIORITY CLAIM

The present application claims the benefit of priority of U.S. Provisional Patent Application No. 62/077,373, entitled Implementation of Third Party Services in a Digital Service Platform, filed Nov. 10, 2014, which is incorporated herein by reference for all purposes.

FIELD

The present disclosure relates generally to digital service applications and more particularly to implementing third party services in a digital service platform.

BACKGROUND

It can be desirable to implement various features and aspects of a third party service in a different digital service platform. For instance, a third party service can be implemented in a digital mapping system. Digital mapping systems allow a user to search for, identify, and discover information about geographic locations. Today, a wide variety of computing devices support software applications that display interactive digital mapping systems. Due at least in part to the increased popularity of digital mapping systems, the capabilities and services offered have become more robust in recent years. For instance, third party service providers have begun to implement aspects of their services within digital map environments. Various third party service providers such as, for instance, those who provide retail services, food services, or transit services may wish to implement aspects of their services within a digital mapping system. These service providers can coordinate with digital map providers to implement their services within the digital map provider's system. The implementation of third party services may benefit both the digital map provider and the third party service provider.

However, often times, a service provider may wish to limit the scope of their service within the service platform. For instance, a third party may wish to limit the number of users that are able to gain access to the service within the digital mapping service. The third party may wish to control this limitation globally or based on regional parameters governed by said third party. The parties can coordinate the implementation based at least in part on their respective needs and requirements.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for granting user access to one or more services of a service provider. The method includes providing, by one or more computing devices associated with a first service provider, an application program interface to a second service provider. The application program interface comprises one or more interfaces configured to receive one or more access parameters. The application program interface is associated with implementing one or more services of the second service provider in one or more services of the first service provider. The method further includes receiving, by the one or more computing devices associated with the first service provider, one or more access parameters from the second service provider. The one or more access parameters comprise a total users parameter indicative of the total amount of users to be granted access to the one or more services of the second service provider. The method further includes determining, by the one or more computing devices associated with the first service provider, access of a user to the one or more services of the second service provider based at least in part on the one or more access parameters.

Other example aspects of the present disclosure are directed to systems, apparatus, tangible, non-transitory computer-readable media, user interfaces, memory devices, and electronic devices for implementing a third party service in a digital mapping system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
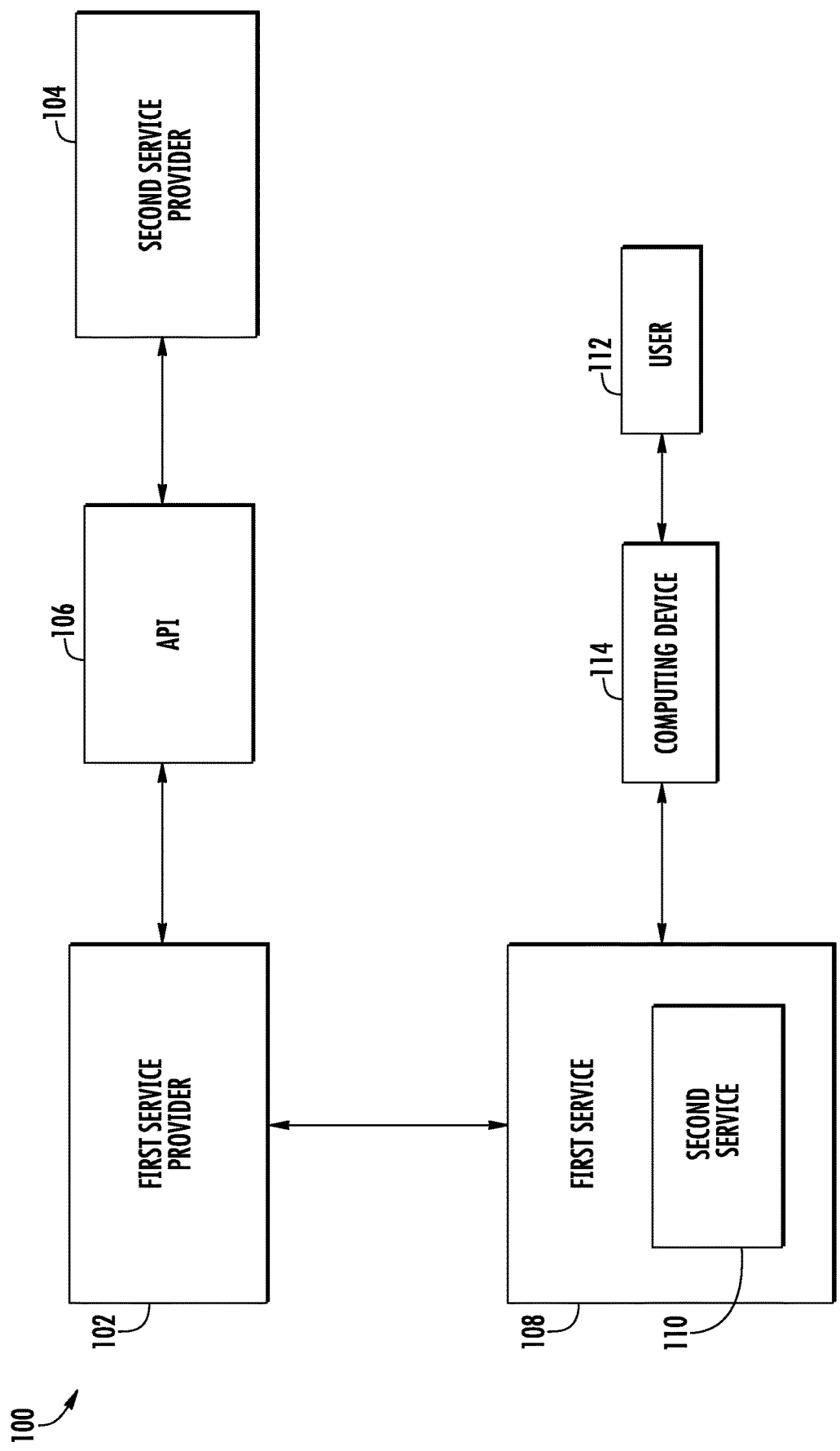
FIG. 1 depicts an overview of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to the implementation of a third party service into another service, such as, for instance, a digital mapping system.

Implementing an external third party service into a digital mapping system or any other suitable service can require a large degree of manual coordination and communication between parties. For instance, the parties may need to share information relating to scope, extent and timeframe to facilitate the implementation. The coordination between parties can last well into the implementation of the service, and even throughout its entirety. This ongoing back and forth can be expensive, inefficient, and time intensive.

In light of the unique challenges described above, the disclosed embodiments provide features for a more efficient implementation of a third party service into another service. Specific algorithms are implemented to determine access of a user to one or more services of a service provider. Such implementation helps to facilitate the integration of the one or more services into a digital mapping system while requiring minimal communication between the parties. The present disclosure is discussed with reference to implementation of third party services in a digital mapping system for purposes of illustration and discussion. Those of ordinary skill in the art, using the disclosures provided herein, will understand that example aspects of the present disclosure can be used to implement any third party service in other digital service platforms.

For instance, according to example embodiments of the present disclosure, an application program interface can be provided by a first service provider to a second service provider. The first service provider can be, for instance, a digital map provider. The second service provider can be, for instance, a retail establishment, a restaurant, a car rental service or any other suitable service provider. The application program interface can be associated with facilitating the implementation of one or more services of the second service provider in one or more services of the second service provider. The application program interface can comprise one or more interfaces configured to receive one or more access parameters.

The one or more access parameters can include, for instance, a total users parameter. The total users parameter can indicate the total number of users for whom access to the one or more services of the second service provider is to be given. The one or more access parameters can further include one or more regional parameters. The one or more regional parameters can indicate one or more geographic areas in which the one or more services of the second service provider is to be implemented. For instance, the one or more regional parameters can comprise a town, city, metropolitan area, or any other suitable geographic area in which services can be provided.

The one or more access parameters can further include, for instance, one or more regional users parameters. The one or more regional users parameters can indicate a total number of users in a particular geographic area for whom access to the one or more services of the second service provider is to be given. A regional users parameter can be associated with a corresponding regional parameter. For instance, a regional users parameter can indicate that a particular service of the second service provider is to have a maximum of 100,000 users in the city of Chicago.

The application program interface can be provided to the second service provider without regard to the total user base of the first service provider. For instance, the second service provider can input, as the total users parameter, an absolute number of total users, but the second service provider may not be able to determine how this number corresponds proportionally to the user base of the first service provider.

Once the application program interface has been provided, the second service provider can input one or more access parameters and provide them to the first service provider. The one or more inputted access parameters can be determined based at least in part on the second service provider's particular needs and/or requirements. For instance, the inputted access parameters can be determined based at least in part on the population of a given geographic area. Further considerations can include infrastructural characteristics of the second service provider and/or its maximum user capacity.

Once the access parameters have been received by the first service provider and the one or more services of the second service provider have been implemented, a user can request access to the one or more services. The request for access from the user can be received by the first service provider. The request can be transmitted, for instance, from a mobile device associated with the user. Responsive to this request, the first service provider can determine whether to grant access to the user. This determination can be based at least in part on the one or more access parameters.

More particularly, the determination of access can comprise implementing a plurality of user groups. A user who requests access to the one or more services of the second service provider can have an associated user identification. The user identification can be a user name, a user number, or any other suitable form of identification including an anonymized identification. Once the plurality of user groups has been implemented, a subset of user groups for which access is to be granted can be determined. The subset can be determined, for instance, based at least in part on the total users parameter. The user identification of the requesting user can then be mapped into one of the plurality of user groups. The user groups can contain any suitable number of users and can vary, for instance, based at least in part on the qualities and characteristics of the service providers.

Once the user identification has been mapped into a user group, access can be determined, such that access is granted if the user identification has been mapped into the subset. For instance, access can be granted to every user who has been mapped into any user group in a specified subset of user groups, such that the total amount of users in the subset of user groups does not exceed the total users parameter. Any users who have been mapped into a user group not in the subset of user groups will not be granted access.

In an alternative embodiment, the first service provider can retain some control over the implementation. For instance, the first service provider may restrict the total amount of users for whom access is to be granted, or the first service provider may limit the rate at which users are granted access. In this embodiment, the first service provider may override access parameters received by the second service provider.

In another example embodiment, access can be determined on a region-by-region basis. For instance, the first service provider can implement a plurality of user groups. Each user group of the plurality can be associated with one or more geographic areas. Once the plurality of user groups have been implemented, a location of the requesting user can be determined. The location can be determined, for instance, by a positioning system associated with the requesting user's mobile device. Based at least in part on the requesting user's location, the requesting user can be associated with a geographic area. The requesting user's user identification can then be mapped into a user group associated with the requesting user's associated geographic area.

Once the user identification has been mapped into a user group, a regional sum can be determined. The regional sum can comprise the sum total of users that have been mapped to the subset of user groups that are associated with the requesting user's associated geographic area. The regional sum can then be compared to a regional users parameter associated with the requesting user's associated geographic area. Access can then be granted if the regional sum does not exceed the regional users parameter.

Other example aspects of the disclosure can include varying the total and/or regional users parameters over time. For instance, these parameters can be increased at a rate corresponding to the growth of the one or more services of the service providers. As the service providers grow and their user capacities increase, the total and/or regional users parameters can increase to reflect that growth. As another example, these parameters can vary based at least in part on the population changes of one or more geographic areas. The second service provider can specify that the access parameters vary at a set rate over time, or the second service provider can manually update the access parameters as needed.

According to an example embodiment, a service provider and a digital map provider coordinate to implement a service of the service provider into a digital mapping system of the digital map provider. The digital map provider provides an application program interface to the service provider. The application program interface is associated with implementing third party services into the digital mapping system and comprises one or more interfaces configured to receive one or more access parameters. The service provider provides one or more access parameters to the digital mapping system. The one or more access parameters includes a total users parameter indicating the total number of users to be given access to the service within the digital mapping system. The digital mapping system receives the one or more access parameters from the service provider. The digital mapping system then receives a request from a user for access to the service within the digital mapping system. Responsive to the request, the digital mapping system determines whether to grant access to the requesting user based at least in part on the received access parameters. If access is granted, the user will be able to utilize the service.

Example Application Program Interfaces

FIG. 1 depicts an example system 100 for granting access of a user to one or more services of a service provider according to example embodiments of the present disclosure. A first service provider 102 can provide an application program interface (API) 106 to a second service provider 104. API 106 can comprise one or more interfaces configured to receive one or more access parameters. API 106 can be associated with implementing one or more services of the second service provider within one or more services of the first service provider. For instance, API 106 can be used to implement second service 110 into first service 108. In this example, first service 108 can be a service provided by first service provider 102, such as a digital mapping service, and second service 110 can be a service provided by second service provider 104.

Those skilled in the art will appreciate that an API can comprise functions, messages (commands), data structures and data types used in creating applications that run under one or more software programs or hardware devices. For instance, an API can define a particular set of rules and specifications that a software program uses to communicate with another software program. In this manner, an API provides an interface between the software programs. The term 'API' can refer to a complete interface, a single function, or a set of APIs. Therefore, the scope of its meaning is usually determined by the context of its usage. API 106 of the present disclosure can be any suitable API used to provide the desired functionality, such as for instance a framework for facilitating a unidirectional data exchange between parties.

Once API 106 has been provided by first service provider 102, second service provider 104 can determine one or more access parameters. The one or more access parameters can comprise, for instance, a total users parameter. The total users parameter can indicate the total amount of users for whom access to the one or more services of the second service provider is to be given. For instance, the second service provider can limit access to the one or more services to 100,000 users.

The one or more access parameters can further comprise one or more regional parameters. The one or more regional parameters can indicate one or more geographic areas in which the one or more services of the second service provider is to be implemented. The one or more geographic areas can be a town, city, metropolitan area, state, or any other suitable geographic area.

The one or more access parameters can further include one or more regional users parameters. The one or more regional users parameters can indicate an amount of users in a geographic area for whom access is to be given. The one or more regional users parameters can correspond to one or more regional parameters. For instance, second service provider 104 can specify that, in the city of Chicago, 100,000 users are to be given access.

Once, second service provider 104 has provided the one or more access parameters to first service provider 102, first service provider 102 can implement second service 110 into first service 108. Second service 110 can be implemented in first service 108 based at least in part on the one or more access parameters. The implementation can be performed in any suitable manner that provides the desired functionality.

Once second service 110 has been implemented, users can begin requesting access to use second service 110. For instance, user 112 can request access to second service 110 by communicating with first service 108. User 112 can communicate with first service 108 using an associated computing device, such as computing device 114. Computing device 114 can be a smartphone, tablet, cellular phone, wearable device, laptop, desktop, or any other suitable computing device capable of utilizing first service 108 and second service 110. Computing device 114 can communicate with first service 108 over a network, such as for instance, network 540 of FIG. 5.

Upon receiving the request for access, first service 108 of FIG. 1 can determine whether to grant access to user 112. Access can be determined, based at least in part on the one or more access parameters. More particularly, access can be granted if the total amount of users for whom access has already been granted is less than, for instance, the total users parameter. Particular aspects of determining whether to grant access to a user will be described in more detail below with reference to FIGS. 2, 3, and 4.

Example Methods for Granting User Access to a Service

Figure 2:
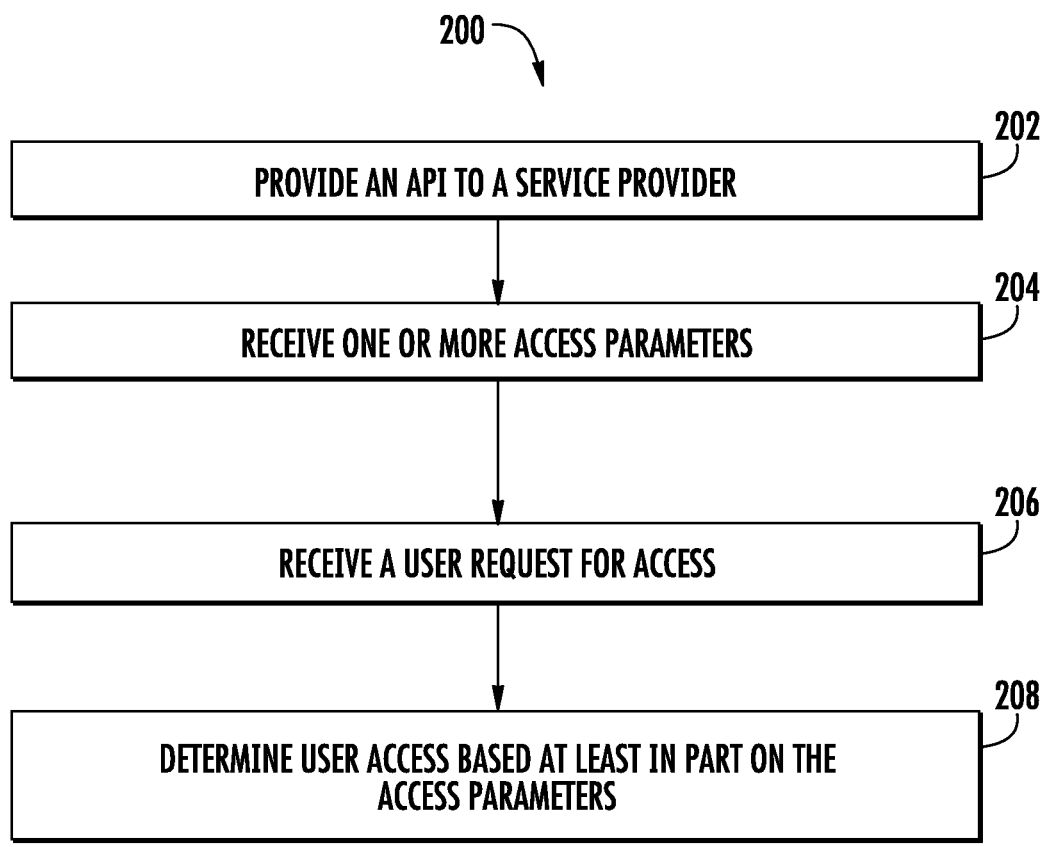
FIG. 2 depicts a flow diagram of an example method for granting user access to one or more services of a service provider according to example embodiments of the present disclosure.

FIG. 2 depicts a flow diagram of an example method (200) for granting user access to one or more services of a service provider according to example embodiments of the present disclosure. Method (200) can be implemented by one or more computing devices, such as one or more of the computing devices depicted in FIG. 5. In addition, FIG. 2 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (202), method (200) can include a first service provider providing an API to a second service provider. The API can comprise one or more interfaces configured to receive one or more access parameters. The API can be associated with implementing one or more services of the second service provider with one or more services of the first service provider.

At (204), method (200) can include receiving one or more access parameters. The one or more access parameters can include a total users parameter. The total users parameter can be indicative of the total number of users for whom access to the one or more services of the second service provider is to be given.

At (206), method (200) can include receiving a request for access from a requesting user. The request for access can be a request to access the one or more services of the second service provider implemented in the one or more services of the second service provider.

At (208), method (200) includes, responsive to the request for access, determining whether to grant access to the requesting user. The determination can be made based at least in part on the one or more access parameters. In an alternative embodiment, a request for access does not have to be made for access to the second service to be granted. For instance, access can be granted to a user as part of an advertisement or a promotional campaign without the user having to request access.

Figure 3:
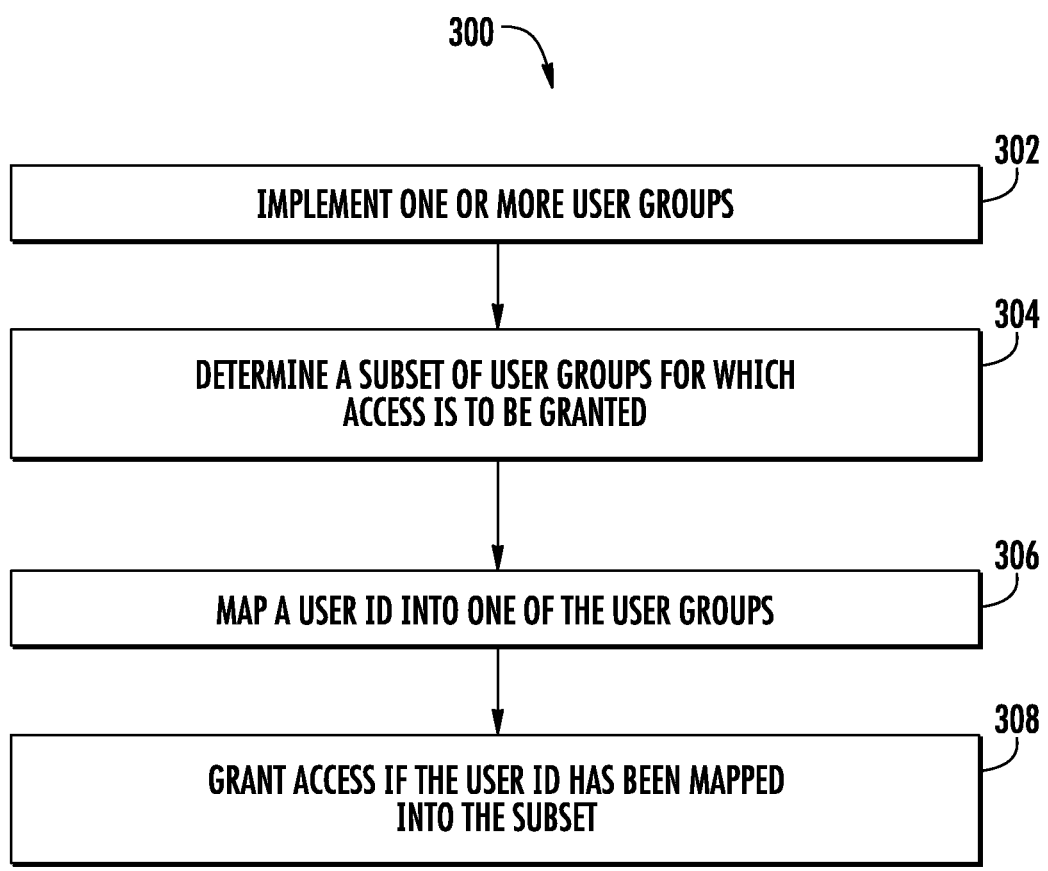
FIG. 3 depicts a flow diagram of an example method for determining user access to one or more services of a service provider according to example embodiments of the present disclosure.

FIG. 3 depicts a flow diagram of an example method (300) for determining user access to one or more services of a service provider. More particularly, method (300) expands on (208) of method (200).

At (302), method (300) can include implementing a plurality of user groups. The user groups can be implemented using, for instance, buckets that compartmentalize users into various groups. It will be appreciated that the user groups can be implemented by any other suitable techniques for dividing users into groups. Each user group of the plurality can hold any suitable number of users, which can be chosen in any suitable manner.

At (304), method (300) includes determining a subset of user groups for which access is to be granted. The subset can be determined based at least in part on the total users parameter. For instance, if the total users parameter is 100,000 users, total number of users in the subset will be 100,000.

At (306), method (300) can include mapping a user identification associated with the requesting user into one user group of the plurality of user groups. Every user who requests access to the one or more services has an associated user identification. When any user requests access to the one or more services, their associated user identification is mapped into a user group. Once a user identification has been mapped to a user group, it will remain in that user group for the duration of the implementation. In this manner, method (300) can calculate the total amount of users who have requested access to the one or more services. For instance, the total amount of user identifications that have been mapped to the plurality of user groups can be equal to the amount of users who have requested access to the one or more services.

At (308), method 300 can include determining access of the requesting user to the one or more services. Access can be determined such that access is granted if the user identification associated with the requesting user has been mapped into the subset. Access can also be determined on a region-by-region basis. For instance, a determination of access for a user in Chicago can be independent of a determination of access for a different user in Dallas. Further, a determination of access for a user in Chicago can be independent of a determination of access in Dallas for the same user. Determination of access in this manner is described more particularly in FIG. 4.

Figure 4:
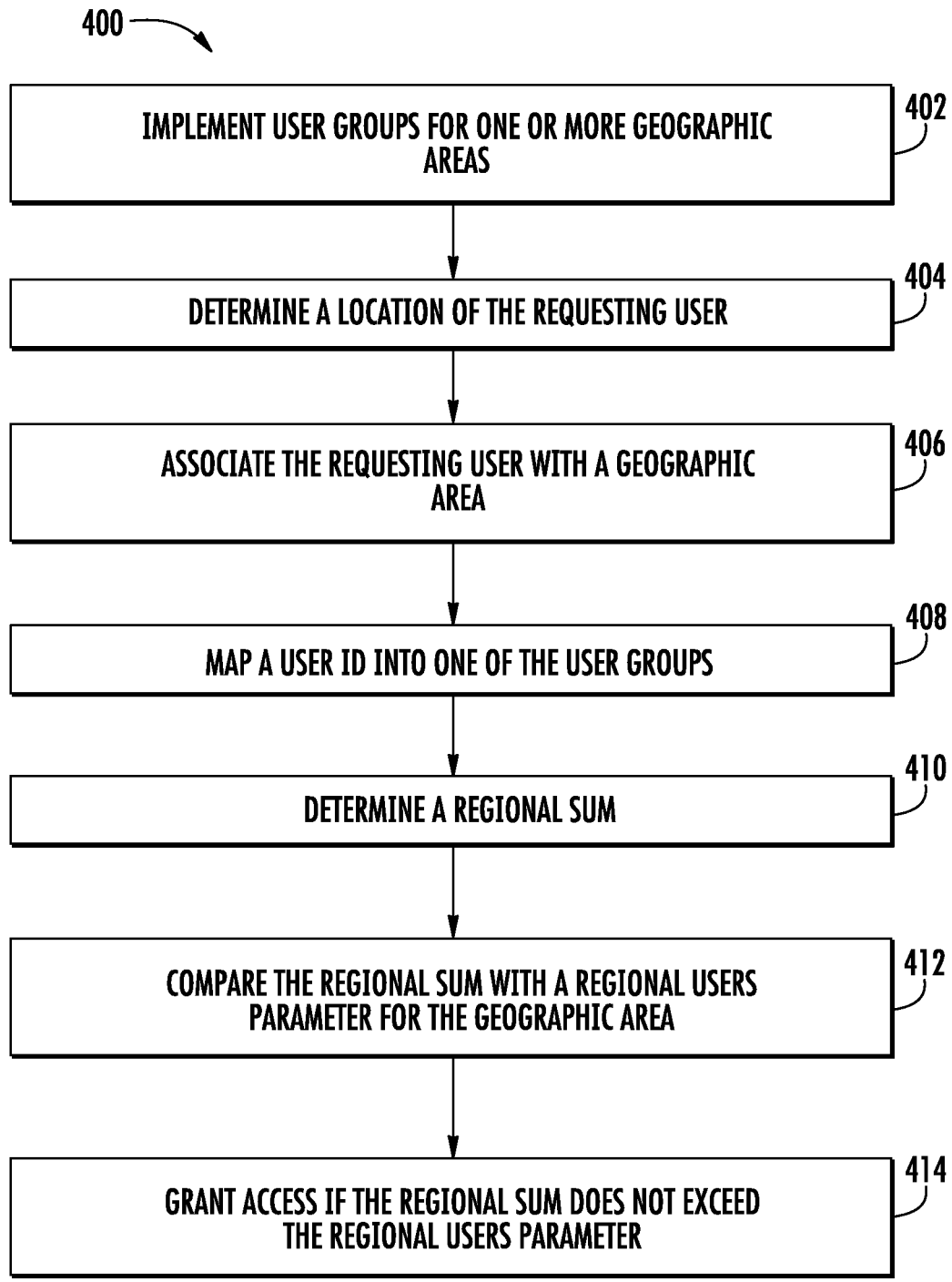
FIG. 4 depicts a flow diagram of an example method for determining user access to one or more services of a service provider according to example embodiments of the present disclosure.

FIG. 4 depicts a flow diagram of an example method for determining access of a user to one or more services on a region-by-region basis. At (402), method (400) includes implementing a plurality of user groups. Each user group of the plurality of user groups is associated with one or more geographic areas. For instance, a first user group of the plurality of user groups can be associated with Chicago and a second user group of the plurality of user groups can be associated with Dallas. The amount of user groups associated with any geographic area can vary, for instance, based at least in part on the population of the geographic area and the size of each user group.

At (404), method (400) includes determining a location of the requesting user. The location of the requesting user can be determined, for instance, by a computing device associated with the requesting user, such as computing device 114 from FIG. 1. More particularly, the location of the user can be determined by a positioning system (e.g. a GPS system) associated with the requesting user's computing device.

At (406), method (400) includes associating the requesting user with a geographic area. The association can be determined based at least in part on the location of the requesting user. For instance, if a user's location is determined by latitude and longitude coordinates, the associated geographic area can be the geographic area in which the coordinates are located.

At (408), method (400) includes mapping a user identification associated with the requesting user into one user group of the plurality of user groups. The user group to which the user identification is mapped is associated with the same geographic area with which the requesting user is associated. For instance, if the requesting user's associated geographic area is the city of Chicago, the user's user identification is mapped to a user group that is also associated with the city of Chicago.

At (410), method (400) includes determining a regional sum. The regional sum can be the sum total of user identifications in the subset of user groups that is associated with the requesting user's associated geographic area. To continue the example from above, the regional sum is found by adding every user identification that has been mapped to a user group associated with Chicago.

At (412), method (400) includes comparing the regional sum with a regional users parameter associated with the requesting user's geographic area. The regional users parameter can specify, an amount of users in a geographic area to be given access to the one or more services. At (414) method (400) includes determining access of the requesting user to the one or more services such that access is granted if the regional sum does not exceed the regional users parameter.

Example Computing Environment for Granting User Access to a Service

Figure 5:
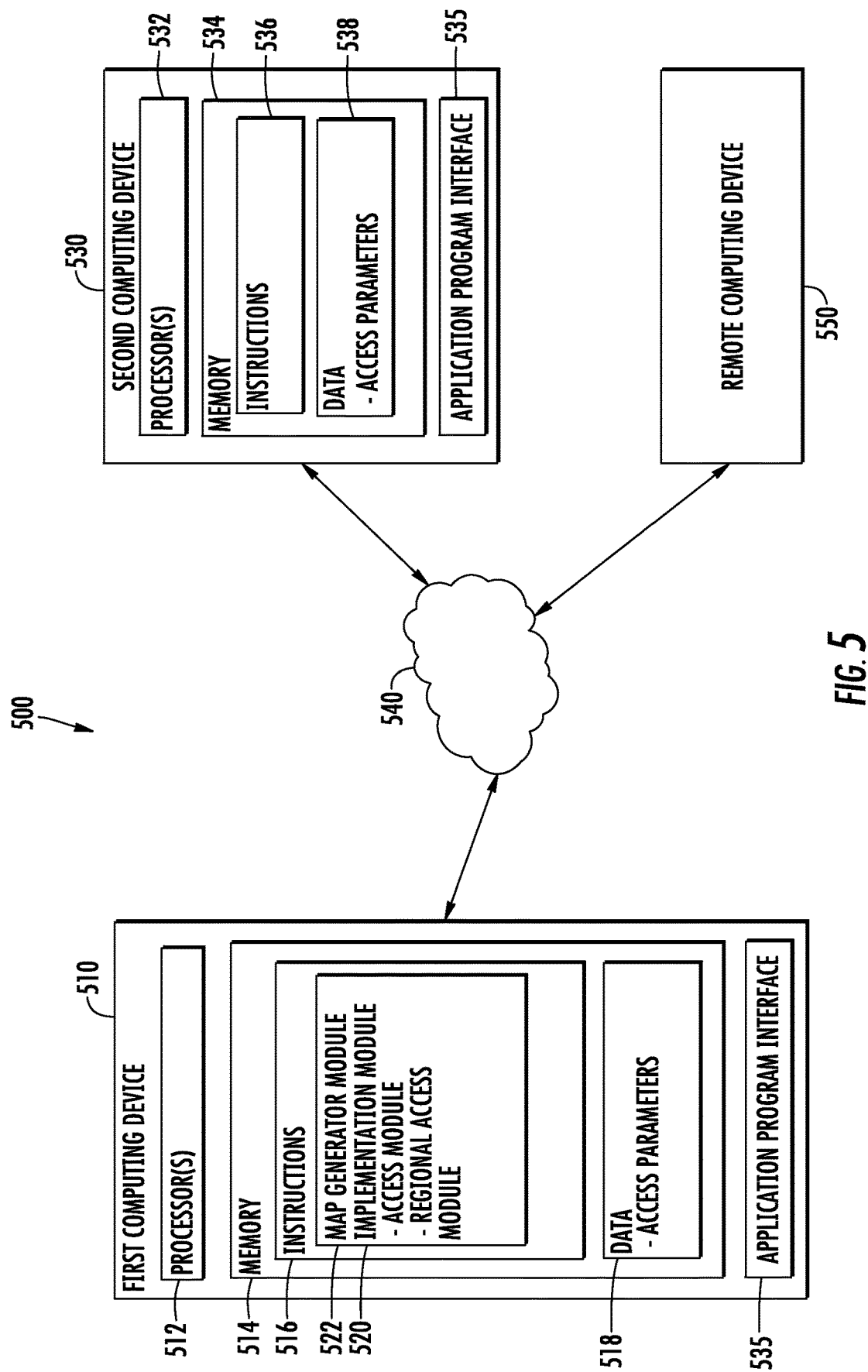
FIG. 5 depicts an example computing system according to example embodiments of the present disclosure.

FIG. 5 depicts an example computing system that can be used to implement the methods and systems according to example embodiments of the present disclosure. System 500 can include a first computing device 510 that communicates with a second computing device 530 over a network 540. System 500 can further include one or more remote computing device(s) 550 that communicate over network 540 with first computing device 510. The system can be implemented using any suitable architecture, such as for instance a client-server architecture, or a single computing device.

System 500 includes a first computing device 510. First computing device 510 can be, for instance, a web server, and can host a geographic information system/digital mapping system. First computing device 510 can be implemented using any suitable computing device(s). First computing device 510 can have one or more processors 512 and memory 514. First computing device 510 can also include a network interface used to communicate with one or more computing devices over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. Memory 514 can include any one or more computer-readable media, including, but not limited to, non-transitory computer-readable media, RAM, ROM, hard drives, flash drives, or other memory devices. Memory 514 can store information accessible by the one or more processors 512, including computer-readable instructions 516 that can be executed by the one or more processors 512. Instructions 516 can be any set of instructions that when executed by the one or more processors 512, cause the one or more processors 512 to perform operations. For instance, instructions 516 can be executed by the one or more processors 512 to implement one or more modules configured to implement a map generator module 522, implementation module 520 and/or various aspects of any of the methods disclosed herein.

Map generator module 522 can be used to provide a digital mapping system. Implementation module 520 can be used to implement one or more third party services within the digital mapping system. Implementation module 520 can include one or more modules such as an access module and a regional access module. The access module can be configured to determine access of a user to the one or more services of the third party service provider, such as in method (300) of FIG. 3. The regional access module can be configured to provide access on a region-by-region basis, such as in method (400) of FIG. 4.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Memory 514 can also include data 518 that can be retrieved, manipulated, created, or stored by the one or more processors 512. Data 518 can include, for instance, access parameters, and other information. Data 518 can be stored in one or more databases. The one or more databases can be connected to first computing device 510 by a high bandwidth LAN or WAN, or can also be connected to first computing device 510 through network 540. The one or more databases can be split up so that they are located in multiple locales.

First computing device 510 can exchange data with second computing device 530 and one or more remote computing devices 550 over network 540. For instance, first computing device 510 can share API 535 with second computing device 530. API 535 can be associated with implementing one or more services of a second service provider in one or more services of a second service provider in accordance with example aspects of the present disclosure.

Similar to first computing device 510, second computing device 530 can include one or more processor(s) 532 and a memory 534. The one or more processor(s) 532 can include one or more central processing units (CPUs), graphics processing units (GPUs) dedicated to efficiently rendering images, and/or other processing devices. Memory 534 can include one or more computer-readable media and can store information accessible by the one or more processors 532, including instructions 536 that can be executed by the one or more processors 532 and data 538.

Second computing device 530 can also include a network interface used to communicate with first computing device 510 over network 540. The network interface can include any suitable components for interfacing with one more networks, including for example, transmitters, receivers, ports, controllers, antennas, or other suitable components.

Remote computing device 550 can be any suitable type of computing device, such as a general purpose computer, special purpose computer, laptop, desktop, mobile device, smartphone, tablet, wearable computing device, a display with one or more processors, or other suitable computing device. Although one remote computing device 550 is illustrated in FIG. 5, any number of remote computing devices 550 can be connected to first computing device 510 over network 540.

Similar to first computing device 510 and second computing device 530, a remote computing device 550 can include one or more processor(s) and a memory. The one or more processor(s) can include one or more central processing units (CPUs), graphics processing units (GPUs) dedicated to efficiently rendering images, and/or other processing devices. The memory can include one or more computer-readable media and can store information accessible by the one or more processors, including instructions that can be executed by the one or more processors and data. For instance, the memory can store instructions for requesting access to one or more services of a third party.

Remote computing device 550 can include various input/output devices for providing and receiving information from a user, such as a touch screen, touch pad, data entry keys, speakers, and/or a microphone suitable for voice recognition. For instance, remote computing device 550 can have a display for presenting map data of a geographic area to a user.

Remote computing device 550 can further include a positioning system. The positioning system can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

Remote computing device 550 can further include a network interface used to communicate with one or more remote computing devices (e.g. first computing device 510) over network 540. The network interface can include any suitable components for interfacing with one more networks, including for example, transmitters, receivers, ports, controllers, antennas, or other suitable components.

Network 540 can be any type of communications network, such as a local area network (e.g. intranet), wide area network (e.g. Internet), cellular network, or some combination thereof. Network 540 can also include a direct connection between second computing device 530 and first computing device 510. In general, communication between first computing device 510 and second computing device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL)

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for granting user access to one or more services of a service provider, the method comprising:
   providing, by one or more computing devices associated with a first service provider, an application program interface to a second service provider, the application program interface comprising one or more interfaces configured to receive one or more access parameters, the application program interface being associated with implementing one or more services of the second service provider in one or more services of the first service provider;
   receiving, by the one or more computing devices associated with the first service provider, one or more access parameters from the second service provider, the one or more access parameters comprising an access rate limitation parameter associated with a maximum rate at which users can be granted access and a total users parameter that is based in part on infrastructural characteristics of the second service provider and is indicative of the total amount of users to be granted access to the one or more services of the second service provider;
   receiving, by the one or more computing devices associated with the first service provider, a request for access to the one or more services of the second service provider from a user associated with an anonymized user identification mapped to one of a plurality of user groups;
   determining, by the one or more computing devices, a subset of user groups from the plurality of user groups for which access is to be granted, the subset determined based at least in part on the total users parameter; and
   granting, by the one or more computing devices associated with the first service provider, access to the one or more services of the second service provider to the user based at least in part on the one or more access parameters and the anonymized user identification being mapped to the subset of the plurality of user groups to which the user is granted access.

2. The computer-implemented method of claim 1, wherein the one or more access parameters further comprises one or more regional parameters indicative of one or more geographic areas in which the one or more services of the second service provider are provided.

3. The computer-implemented method of claim 2, wherein the one or more access parameters comprises one or more regional users parameters indicative of the amount of users in a geographic area for whom access to the one or more services of the second service provider is to be given.

4. The computer-implemented method of claim 3, wherein the total users parameter is the sum of the one or more regional users parameters.

5. The computer-implemented method of claim 1, wherein determining access to the one or more services of the second service provider comprises:
   implementing, by the one or more computing devices, a plurality of user groups;
   determining, by the one or more computing devices, a subset of user groups from the plurality of user groups for which access is to be granted, the subset determined based at least in part on the total users parameter;
   mapping, by the one or more computing devices, a user identification associated with the user into one user group of the plurality of user groups; and
   determining, by the one or more computing devices, access of the user to the one or more services, such that access is granted if the user identification associated with the user has been mapped into the subset.

6. The computer implemented method of claim 3, wherein determining access to the one or more services comprises:
   implementing, by the one or more computing devices, a plurality of user groups, each user group of the plurality of user groups being associated with one or more geographic areas;
   determining, by the one or more computing devices, a location of the user;

associating, by the one or more computing devices, the user with a geographic area based at least in part on the location of the user;

mapping, by the one or more computing devices, a user identification associated with the user into one user group of the plurality of user groups, the one user group being associated with the user's associated geographic area;

determining, by the one or more computing devices, a regional sum, the regional sum being the sum total of user identifications in the subset of user groups that are associated with the user's associated geographic area;

comparing, by the one or more computing devices, the regional sum with a regional users parameter associated with the user's geographic area; and determining, by the one or more computing devices, access of the user to the one or more services, such that access is granted if the regional sum does not exceed the regional users parameter.

7. The computer-implemented method of claim 1, wherein the total users parameter can be increased over time.

8. The computer-implemented method of claim 1, wherein the application program interface is provided such that the second service provider is not made aware of the total user base of the first service provider.

9. The computer-implemented method of claim 7, wherein the total users parameter is increased based at least in part on the population of a geographic area in which the one or more services of the second service provider is provided.

10. The computer-implemented method of claim 1, wherein the one or more services of the first service provider comprises a digital mapping system.

11. A computing system for a first service provider, comprising:
one or more processors; and
one or more non-transitory computer-readable media storing computer-readable instructions that when executed by the one or more processors cause the one or more processors to perform operations, the operations comprising:
providing an application program interface to a second service provider, the application program interface comprising one or more interfaces configured to receive one or more access parameters, the application program interface being associated with implementing one or more services of the second service provider in one or more services of the first service provider;
receiving one or more access parameters from the second service provider, the one or more access parameters comprising an access rate limitation parameter associated with a maximum rate at which users can be granted access and a total users parameter that is based in part on infrastructural characteristics of the second service provider and is indicative of the total amount of users to be granted access to the one or more services of the second service provider;
receiving a request for access to the one or more services of the second service provider from a user associated with an anonymized user identification mapped to one of a plurality of user groups;
determining a subset of user groups from the plurality of user groups for which access is to be granted, the subset determined based at least in part on the total users parameter; and
granting access to the one or more services of the second service provider to the user based at least in part on the one or more access parameters and the anonymized user identification being mapped to the subset of the plurality of user groups to which the user is granted access.

12. The computing system of claim 11, wherein the one or more access parameters comprises one or more regional users parameters indicative of the amount of users in a geographic area for whom access to the one or more services of the second service provider is to be given.

13. The computing system of claim 11, wherein the operation of determining access of the user comprises:
implementing a plurality of user groups;
determining a subset of user groups from the plurality of user groups for which access is to be granted, the subset determined based at least in part on the total users parameter;
mapping a user identification associated with the user into one user group of the plurality of user groups; and
determining access of the user to the one or more services, such that access is granted if the user identification associated with the user has been mapped into the subset.

14. The computing system of claim 12, wherein the operation of determining access of the user comprises:
implementing a plurality of user groups, each user group of the plurality of user groups being associated with one or more geographic areas;
determining a location of the user;
associating the requesting user with a geographic area based at least in part on the location of the user;
mapping a user identification associated with the user into one user group of the plurality of user groups, the one user group being associated with the user's associated geographic area;
determining a regional sum, the regional sum being the sum total of user identifications in the subset of user groups that are associated with the user's associated geographic area;
comparing the regional sum with a regional users parameter associated with the user's geographic area; and
determining access of the user to the one or more services, such that access is granted if the regional sum does not exceed the regional users parameter.

15. One or more non-transitory computer-readable media storing computer-readable instructions that when executed by one or more processors cause the one or more processors to perform operations, the operations comprising:
providing from a first service provider an application program interface to a second service provider, the application program interface comprising one or more interfaces configured to receive one or more access parameters, the application program interface being associated with implementing one or more services of the second service provider in one or more services of the first service provider;
receiving, by the first service provider, one or more access parameters from the second service provider, the one or more access parameters comprising an access rate limitation parameter associated with a maximum rate at which users can be granted access and a total users parameter that is based in part on infrastructural characteristics of the second service provider and varies based in part on a rate of growth of the one or more services of the second service provider and is indicative of the total amount of users to be granted access to the one or more services of the second service provider;

receiving, by the first service provider, a request for access to the one or more services of the second service provider from a user associated with an anonymized user identification mapped to one of a plurality of user groups;

determining a subset of user groups from the plurality of user groups for which access is to be granted, the subset determined based at least in part on the total users parameter; and granting, by the first service provider, access to the one or more services of the second service provider to the user based at least in part on the one or more access parameters and the anonymized user identification being mapped to the subset of the plurality of user groups to which the user is granted access.

16. The one or more non-transitory computer readable media of claim 15, wherein the one or more access parameters comprises one or more regional users parameters indicative of the amount of users in a geographic area for whom access to the one or more services of the second service provider is to be given.

17. The one or more non-transitory computer readable media of claim 15, wherein the operation of determining access of the user comprises:

implementing a plurality of user groups;

determining a subset of user groups from the plurality of user groups for which access is to be granted, the subset determined based at least in part on the total users parameter;

mapping a user identification associated with the user into one user group of the plurality of user groups; and determining access of the user to the one or more services, such that access is granted if the user identification associated with the user has been mapped into the subset.

18. The one or more non-transitory computer readable media of claim 15, wherein the operation of determining access of the user comprises:

implementing a plurality of user groups, each user group of the plurality of user groups being associated with one or more geographic areas;

determining a location of the user;

associating the user with a geographic area based at least in part on the location of the user;

mapping a user identification associated with the user into one user group of the plurality of user groups, the one user group being associated with the user's associated geographic area;

determining a regional sum, the regional sum being the sum total of user identifications in the subset of user groups that are associated with the user's associated geographic area;

comparing the regional sum with a regional users parameter associated with the user's geographic area; and determining access of the user to the one or more services, such that access is granted if the regional sum does not exceed the regional users parameter.

19. The one or more non-transitory computer readable media of claim 15, wherein the one or more services of the first service provider comprises a digital mapping system.

* * * * *